(12) United States Patent
Du et al.

(10) Patent No.: US 12,139,073 B2
(45) Date of Patent: Nov. 12, 2024

(54) REARVIEW DISPLAYS FOR VEHICLES (71) Applicant: GM GLOBAL TECHNOLOGY OPERATIONS LLC, Detroit, MI (US)

(72) Inventors: Zhiyuan Du, Troy, MI (US); Xiaofeng F Song, Novi, MI (US); Joshua Michael Martin, White Lake, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 270 days.

(21) Appl. No.: 17/814,168

(22) Filed: Jul. 21, 2022

(65) Prior Publication Data
US 2024/0025343 A1    Jan. 25, 2024

(51) Int. Cl.
*B60R 1/26* (2022.01)
*B60R 11/00* (2006.01)
*B60R 11/04* (2006.01)

(52) U.S. Cl.
CPC .............. *B60R 1/26* (2022.01); *B60R 11/04* (2013.01); *B60R 2011/004* (2013.01); *B60R 2300/103* (2013.01); *B60R 2300/105* (2013.01); *B60R 2300/308* (2013.01)

(58) Field of Classification Search
CPC .... B60R 1/22; B60R 1/23; B60R 1/26; B60R 1/28; B60R 2300/8066; B60R 2001/1215; B60R 1/27; B60R 1/24; B60R 11/04; B60R 2011/004; B60R 2300/101; B60R 1/002; B60R 2300/103; B60R 2300/306; B60R 1/003; B60R 2300/105; B60R 2300/70; G06T 2210/22

USPC .......................................................... 348/148
See application file for complete search history.

(56) References Cited

U.S. PATENT DOCUMENTS

| 2015/0054950 A1* | 2/2015 | Van Wiemeersch .... B60R 21/01 382/104 |
| 2015/0199579 A1* | 7/2015 | Stainvas Olshansky ................... G06V 10/50 382/104 |
| 2017/0163939 A1* | 6/2017 | Thompson .............. B60R 11/04 |
| 2019/0191064 A1* | 6/2019 | Aihara ...................... B60R 1/26 |
| 2022/0227296 A1* | 7/2022 | Sperrle ................. G06T 3/4038 |

* cited by examiner

Primary Examiner — Nathnael Aynalem
(74) Attorney, Agent, or Firm — Lorenz & Kopf LLP (57) ABSTRACT

Vehicles and systems and methods for providing rearview displays for vehicles are provided. An exemplary system is provided for a vehicle having a gate moveable between closed configuration and opened configurations. The system includes a camera mounted to the gate and configured to collect dynamic pixel images of an area behind the vehicle; a display screen configured to display the collected dynamic pixel images; and memory configured to include executable instructions and a processor configured to execute executable instructions that enable the processor to crop the collected dynamic pixel images to display a lower portion of the collected dynamic pixel images on the display screen when the gate is in the closed configuration, and to crop the collected dynamic pixel images to display an upper portion of the collected dynamic pixel images on the display screen when the gate is in the opened configuration.

20 Claims, 7 Drawing Sheets

REARVIEW DISPLAYS FOR VEHICLES

INTRODUCTION

The technical field generally relates to the field of vehicles and, more specifically, to methods and systems for displaying a rearview from a rear vision camera in a vehicle.

Many vehicles include a rear vision camera that provides a view for a region behind the vehicle. However, in certain circumstances the rear-view camera may be part of a system that does not always provide optimal images in certain situations.

For example, for pickup trucks, sport utility vehicles (SUVs), hatchbacks, and other vehicles, the rear vision camera may be mounted to a gate, such as a tailgate or liftgate, that moves between closed and opened configurations. Thus, the dynamics of the camera location and orientation and of the moving vehicle may be changed.

Accordingly, it is desirable to provide a method for providing an augmented rearview display that communicates an appropriate view according to the present configuration or potential configuration of the vehicle. Furthermore, other desirable features and characteristics will become apparent from the subsequent detailed description and the appended claims, taken in conjunction with the accompanying drawings and the foregoing technical field and background.

SUMMARY

Methods for augmenting rearview displays for vehicles, vehicles with augmented rearview displays, Vehicles with rearview displays, systems for providing rearview displays for vehicles, and methods for providing rearview displays for vehicles are provided.

An exemplary vehicle includes a front end and a rear end; a left side and a right side; and a plurality of cameras including a first camera, a second camera, a third camera, and a fourth camera. In the exemplary vehicle, each camera has a first viewing angle in a first direction and has a second viewing angle, greater than the first viewing angle, in a second direction perpendicular to the first direction. Further, the first camera is mounted to the front end, a second camera is mounted to the left side, the third camera is mounted to the right side, and each of the first camera, the second camera, and the third camera are oriented with the first viewing angle extending in a vertical direction and the second viewing angle extending in a horizontal direction. In the exemplary vehicle, the fourth camera is mounted to the rear end and is oriented with the first viewing angle extending in the horizontal direction and the second viewing angle extending in the vertical horizontal direction.

In certain embodiments, the vehicle further includes a gate at the rear end, wherein the gate is moveable between a closed configuration and an opened configuration, wherein the fourth camera is mounted to the gate and is configured to collect dynamic pixel images of an area behind the vehicle; a display screen configured to display the collected dynamic pixel images; and memory configured to comprise one or more executable instructions and a processor configured to execute executable instructions, wherein the executable instructions enable the processor to crop the collected dynamic pixel images to display a lower portion of the collected dynamic pixel images on the display screen when the gate is in the closed configuration, and to crop the collected dynamic pixel images to display an upper portion of the collected dynamic pixel images on the display screen when the gate is in the opened configuration. In such embodiments, the lower portion of the collected dynamic pixel images may include no more than 75% of the second viewing angle and the upper portion of collected dynamic pixel images may include no more than 75% of the second viewing angle.

In certain embodiments, the vehicle further includes a gate at the rear end, wherein the gate is moveable between a closed configuration and an opened configuration, wherein the fourth camera is mounted to the gate and is configured to collect dynamic pixel images of an area behind the vehicle; a display screen configured to display the collected dynamic pixel images; and memory configured to comprise one or more executable instructions and a processor configured to execute executable instructions, wherein the executable instructions enable the processor to display a graphical overlay to the collected dynamic pixel images on the display screen when the gate is in the opened configuration, and wherein the graphical overlay depicts an outline of a terminal edge of the gate in the opened configuration.

In certain embodiments, the vehicle further includes a gate at the rear end, wherein the gate is moveable between a closed configuration and an opened configuration, wherein the fourth camera is mounted to the gate and is configured to collect dynamic pixel images of an area behind the vehicle; a display screen configured to display the collected dynamic pixel images; and memory configured to comprise one or more executable instructions and a processor configured to execute executable instructions, wherein the executable instructions enable the processor to identify when the gate is in the opened configuration.

In certain embodiments, the vehicle further includes a gate at the rear end, wherein the gate is moveable between a closed configuration and an opened configuration, wherein the fourth camera is mounted to the gate and is configured to collect dynamic pixel images of an area behind the vehicle; a display screen configured to display the collected dynamic pixel images; and memory configured to comprise one or more executable instructions and a processor configured to execute executable instructions, wherein the executable instructions enable the processor to identify when a gate shadow from the gate is present in the collected dynamic pixel images and to remove the gate shadow from the collected dynamic pixel images.

In certain embodiments, the vehicle further includes a gate at the rear end, wherein the gate is moveable between a closed configuration and an opened configuration, wherein the fourth camera is mounted to the gate and is configured to collect dynamic pixel images of an area behind the vehicle; a hitch light at the rear end; a display screen configured to display the collected dynamic pixel images; and memory configured to comprise one or more executable instructions and a processor configured to execute executable instructions, wherein the executable instructions enable the processor to identify when a gate shadow from the gate is present in the collected dynamic pixel images and to activate the hitch light to reduce the gate shadow.

In certain embodiments of the vehicle, the first viewing angle is between 140 to 160 degrees and the second viewing angle is greater than 180 degrees.

In another embodiment, a rearview display system is provided for a vehicle having a gate moveable between a closed configuration and an opened configuration. The exemplary system includes a camera mounted to the gate and configured to collect dynamic pixel images of an area behind the vehicle; a display screen configured to display the collected dynamic pixel images; and memory configured to comprise one or more executable instructions and a processor configured to execute executable instructions, wherein the executable instructions enable the processor to crop the collected dynamic pixel images to display a lower portion of the collected dynamic pixel images on the display screen when the gate is in the closed configuration, and to crop the collected dynamic pixel images to display an upper portion of the collected dynamic pixel images on the display screen when the gate is in the opened configuration.

In certain embodiments of the system, the camera is oriented with a first viewing angle extending in a horizontal direction and a second viewing angle extending in a vertical horizontal direction, wherein the second viewing angle is greater than the first viewing angle. In such embodiments, the lower portion of the collected dynamic pixel images may include no more than 75% of the second viewing angle and the upper portion of collected dynamic pixel images may include no more than 75% of the second viewing angle.

In certain embodiments of the system, when the gate is in the opened configuration, an upper edge of the lower portion of the collected dynamic pixel images is located within 5 degrees of a horizon; and when the gate is in the closed configuration, a lower edge of the upper portion of the collected dynamic pixel images is located within 5 degrees of the horizon.

In certain embodiments of the system, the executable instructions enable the processor to display a graphical overlay to the collected dynamic pixel images on the display screen when the gate is in the opened configuration, and wherein the graphical overlay depicts an outline of a terminal edge of the gate in the opened configuration.

In certain embodiments of the system, the executable instructions enable the processor to identify when the gate is in the opened configuration.

In certain embodiments of the system, the executable instructions enable the processor to identify when a gate shadow from the gate is present in the collected dynamic pixel images and to remove the gate shadow from the collected dynamic pixel images.

In certain embodiments, the system further includes a hitch light mounted to a rear end of the vehicle, and the executable instructions enable the processor to identify when a gate shadow from the gate is present in the collected dynamic pixel images and to activate the hitch light to reduce the gate shadow.

A method is also provided for augmenting a rearview display for a vehicle having a gate moveable between a closed configuration and an opened configuration. The exemplary method includes collecting dynamic pixel images of an area behind the vehicle using a camera mounted on the gate; when the gate is in the closed configuration, cropping the collected dynamic pixel images to display a lower portion of the collected dynamic pixel images on the display screen, via a processor; and when the gate is in the opened configuration, cropping the collected dynamic pixel images to display an upper portion of the collected dynamic pixel images on the display screen, via the processor.

In certain embodiments, the method further includes displaying a graphical overlay to the collected dynamic pixel images on the display screen when the gate is in the opened configuration, via the processor, wherein the graphical overlay depicts an outline of a terminal edge of the gate in the opened configuration.

In certain embodiments, the method further includes identifying, via the processor, when the gate is in the opened configuration from the collected dynamic pixel images.

In certain embodiments, the method further includes identifying, via the processor, when a gate shadow from the gate is present in the collected dynamic pixel images and removing the gate shadow from the collected dynamic pixel images or activating a hitch light to reduce the gate shadow.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

As used herein, the word "exemplary" means "serving as an example, instance, or illustration". As used herein, "a," "an," or "the" means one or more unless otherwise specified. The term "or" can be conjunctive or disjunctive. Open terms such as "include," "including," "contain," "containing" and the like mean "comprising", but in certain embodiments may mean "consisting of". In certain embodiments, numbers in this description indicating amounts, ratios of materials, physical properties of materials, and/or use may be understood as being modified by the word "about". The term "about" as used in connection with a numerical value and the claims denotes an interval of accuracy, familiar and acceptable to a person skilled in the art. In general, such interval of accuracy is ±10%. All numbers in this description indicating amounts, ratios of materials, physical properties of materials, and/or use may be understood as modified by the word "about," except as otherwise explicitly indicated.

The figures are in simplified schematic form and are not to precise scale. Further, terms such as "upper", "lower", "above," "over," "below," "under," "upward," "downward," et cetera, are used descriptively of the figures, and do not represent limitations on the scope of the subject matter, as defined by the appended claims. Any numerical designations, such as "first" or "second" are illustrative only and are not intended to limit the scope of the subject matter in any way. It is noted that while embodiments may be described herein with respect to automotive applications, those skilled in the art will recognize their broader applicability.

As used herein, "in reverse" means that the vehicle is in reverse gear, for geared vehicles, or is in reverse mode for traveling in the reverse direction, or is moving in the reverse direction.

Embodiments herein provide for augmented a rearview display of a vehicle. Specifically, embodiments herein are provided for a vehicle having a rearview camera mounted on a gate, such as a tailgate (which opens downward about a pivotable lower hinge) or liftgate (which opens upward about a pivotable upper hinge).

Figure 1:
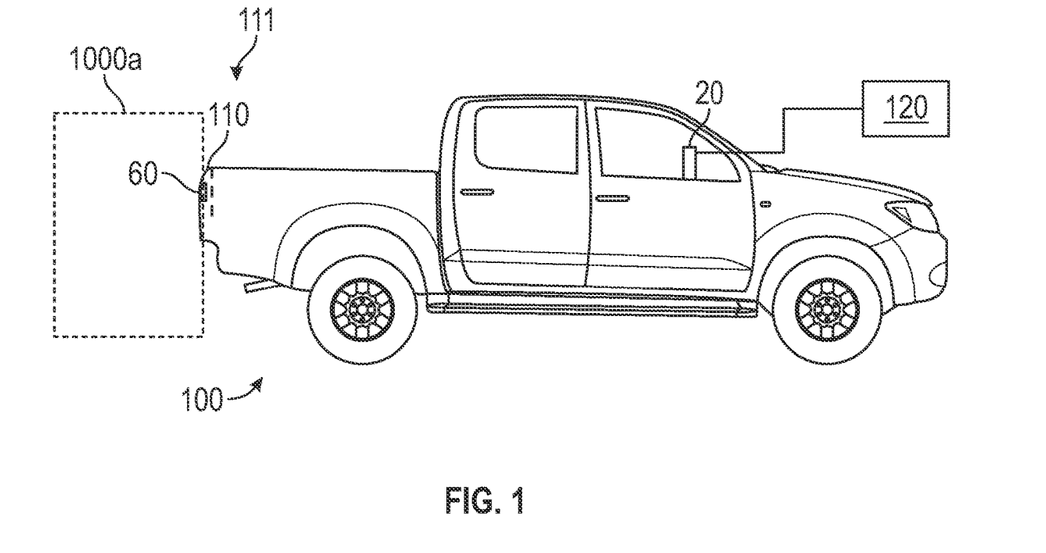
FIG. 1 is a schematic side view of a vehicle having a gate in a closed configuration in accordance with an embodiment.
Figure 2:
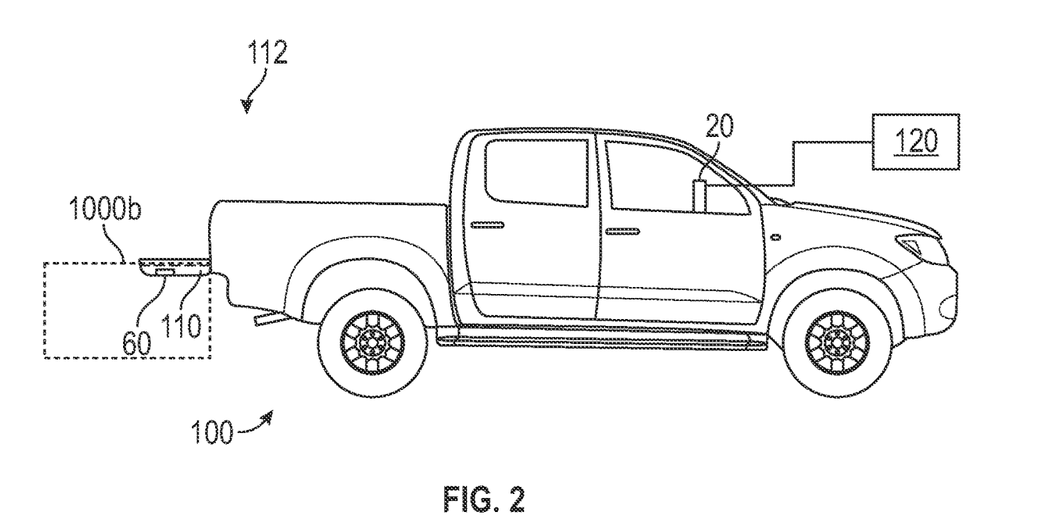
FIG. 2 is a schematic side view of the vehicle of FIG. 1 having a gate in an opened configuration in accordance with an embodiment.
Figure 3:
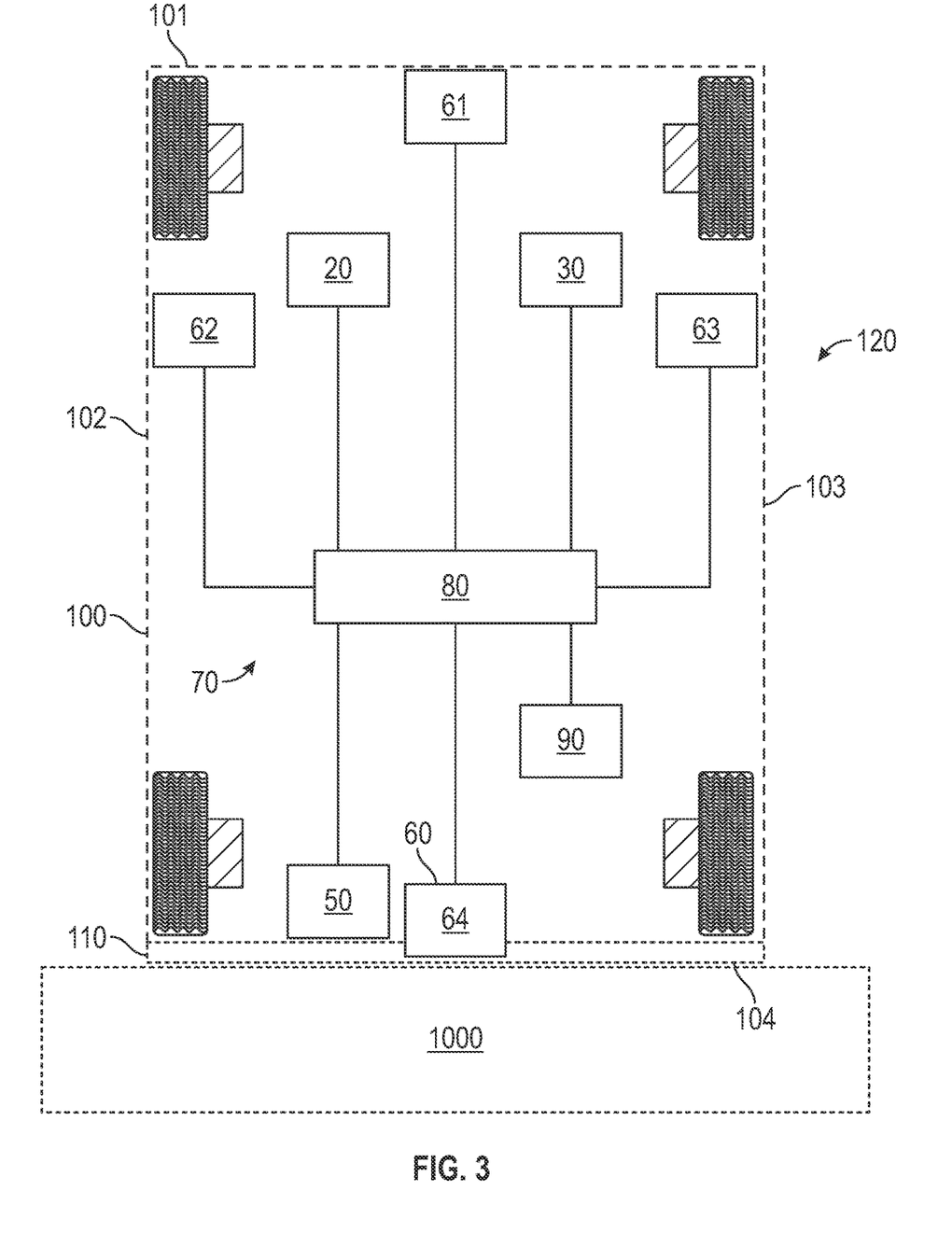
FIG. 3 is a functional block diagram of the vehicle of FIGS. 1-2 in accordance with an embodiment.

Referring to FIGS. 1-3, an exemplary vehicle 100 is illustrated in accordance with various embodiments. In FIG. 1, the vehicle 100 includes a gate 110 in a closed configuration 111. The illustrated gate 110 is a tailgate that opens about a lower hinge, though in certain embodiments the gate 110 may be a liftgate that opens about an upper hinge or other hinge arrangement.

As shown, the vehicle 100 includes a rearview camera 60 mounted to the gate 110. The rearview camera 60 is configured to collect dynamic pixel images of an area 1000 behind the vehicle 100.

The vehicle 100 further includes a computer system 120 associated with a display screen 20 for displaying the collected dynamic pixel images of the area 1000a behind the vehicle 100 in accordance with various embodiments. In accordance with various embodiments, when the gate 110 is closed and the vehicle 100 is in reverse, the computer system 120 is configured to crop the dynamic pixel images and display the cropped images to the user. Accordingly, the user is provided with a rearview display that indicates the pertinent portion of the area 1000a behind the vehicle 100 for traffic or object avoidance.

FIG. 2 illustrates the vehicle 100 with the gate 110 in the opened configuration 112. As shown, the location and pitch angle or perspective of the rearview camera 60 relative to the rest of the vehicle 100 is changed when the gate 110 is moved to the opened configuration 112. As shown, when the perspective of the camera 60 is changed, the area 1000a changes to the area 1000b. In accordance with various embodiments, when the gate 110 is opened and the vehicle 100 is in reverse, the computer system 120 is configured to crop the dynamic pixel images and display the cropped images to the user. Further, the computer system 120 may be configured to generate a graphical overlay and display the augmented cropped images to the user. An exemplary graphical overlay includes an outline of the terminal edge of the gate 110 in the opened configuration. Accordingly, the user is provided with a rearview display that indicates the pertinent portion of the area 1000b behind the vehicle 100 and an indication that the gate is opened for traffic or object avoidance.

FIG. 3 illustrates the computer system 120 and further components of the vehicle 100 in accordance with various embodiments. As shown, the vehicle is outfitted with a plurality of cameras 60, including a front camera 61 mounted to a front end 101 of the vehicle 100, a left camera 62 mounted to a left side 102 of the vehicle 100, a right camera 63 mounted to a right side 103 of the vehicle 100, and a rear camera 64 mounted to a rear end 104 of the vehicle 100, such as to the gate 110.

As shown in FIG. 3, vehicle 100 further includes the rearview display screen 20, a user interface 30, a light 50, a processor 80 and a memory 90.

As shown, the rearview display screen 20, the user interface 30, the light 50, the cameras 60, and the memory 90 are interconnected with the processor 80, and are interconnected with each other through the processor 80. These components may be considered to form a system 70 for providing a rear-view image for vehicle 100.

An exemplary rearview display screen 20 is configured to display the collected dynamic pixel images and may be arranged within a cabin or other interior portion of the vehicle 100 for viewing by an occupant of the vehicle 100.

In exemplary embodiments, the user interface 30 is or includes an input for receiving a user-initiated request. Further, in exemplary embodiments, the user interface 30 may be provided in combination with the rearview display screen 20. For example, the rearview display screen 20 may include a touch screen including one or more pressure sensors configured as a user interface 30 to receive an input or command from a user. In certain embodiments, a swipe or other motion on the touch screen may be used to communicate a request or command from the user to the vehicle 100 or system.

An exemplary light 50 is a hitch light, i.e., is provided to illuminate a hitch at the rear of the vehicle to facilitate connection with a trailer.

Each exemplary camera 60 is connected to the vehicle 100 and is configured to collect dynamic pixel images of the area surrounding the vehicle 100, with rear camera 64 configured to collect dynamic pixel images of the area 1000a, 1000b behind the vehicle 100. In exemplary embodiments, each of the cameras 60 is identical, however, the rear camera 64 is rotated 90 degrees as compared to the other cameras 61-63 to capture a desired viewing range. Specifically, each exemplary camera 60 has a first viewing angle in a first direction and has a second viewing angle, greater than the first viewing angle, in a second direction perpendicular to the first direction. In exemplary embodiments, the first viewing angle is less than 160 degrees, such as 150 degrees. In exemplary embodiments, the second viewing angle is greater than 180 degrees, such as 190 degrees. Further, in exemplary embodiments, cameras 61, 62 and 63 are mounted to the vehicle 100 with the smaller first viewing angle extending in a vertical direction and the larger second viewing angle extending in a horizontal direction. Exemplary rear camera 64 is mounted to the vehicle 100 with the smaller first viewing angle extending in the horizontal direction and the larger second viewing angle extending in the vertical direction. By using identical cameras 60, costs and manufacturing complexity may be reduced.

An exemplary memory 90 is configured to comprise one or more executable instructions and an exemplary processor 80 is configured to execute the executable instructions. In exemplary embodiments, the executable instructions enable the processor 80 to crop the collected dynamic pixel images to display a lower portion of the collected dynamic pixel images on the display screen 20 when the gate 110 is in the closed configuration 111, and to crop the collected dynamic pixel images to display an upper portion of the collected dynamic pixel images on the display screen 20 when the gate 110 is in the opened configuration 112.

In exemplary embodiments, the executable instructions enable the processor 80 to identify when the gate 110 is in the closed configuration 111 or in the opened configuration 112.

In exemplary embodiments, the executable instructions enable the processor 80 to display a graphical overlay to the collected dynamic pixel images on the display screen 20 when the gate 110 is in the opened configuration 112, and wherein the graphical overlay depicts an outline of a terminal edge of the gate 110 in the opened configuration 112.

In exemplary embodiments, the executable instructions enable the processor 80 to identify when a gate shadow from the gate is present in the collected dynamic pixel images and to remove the gate shadow from the collected dynamic pixel images.

In exemplary embodiments, the executable instructions enable the processor 80 to identify when a gate shadow from the gate is present in the collected dynamic pixel images and to activate the hitch light to reduce the gate shadow.

Figure 4:
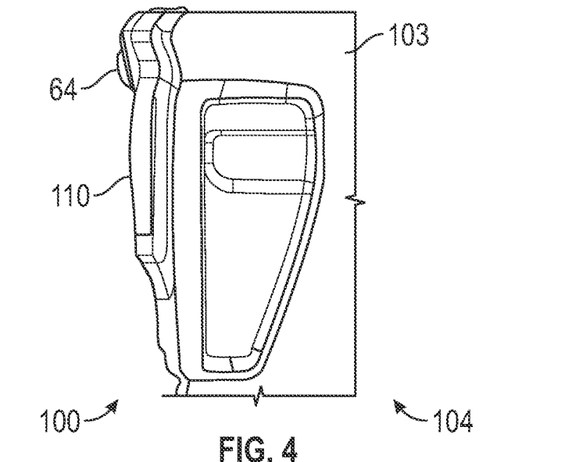
FIG. 4 is a side view of a tailgate having a camera mounted thereto in accordance with an embodiment.

Referring now to FIG. 4 and with continued reference to FIGS. 1-3, a side view of an exemplary rear end 104 of vehicle 100 is illustrated. Rear end 104 includes gate 110 which is pivotably connected to a rear panel on the right side 103. As shown, the rearview camera 64 is mounted to the gate 110. Further, gate 110 is designed such that the rearview camera 64 extends farther distally than any other feature of the gate 110.

Figure 5:
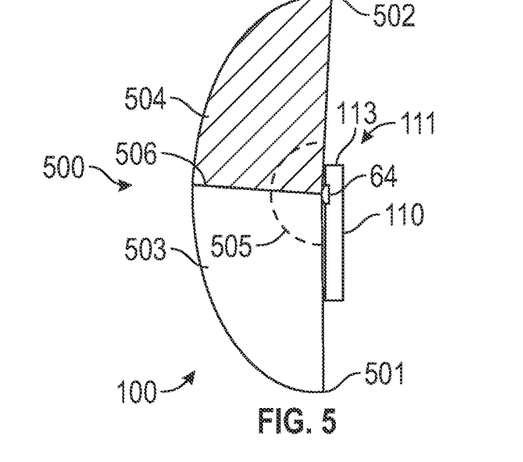
FIG. 5 is a schematic side view of a camera mounted to a gate in a closed configuration in accordance with an embodiment.
Figure 6:
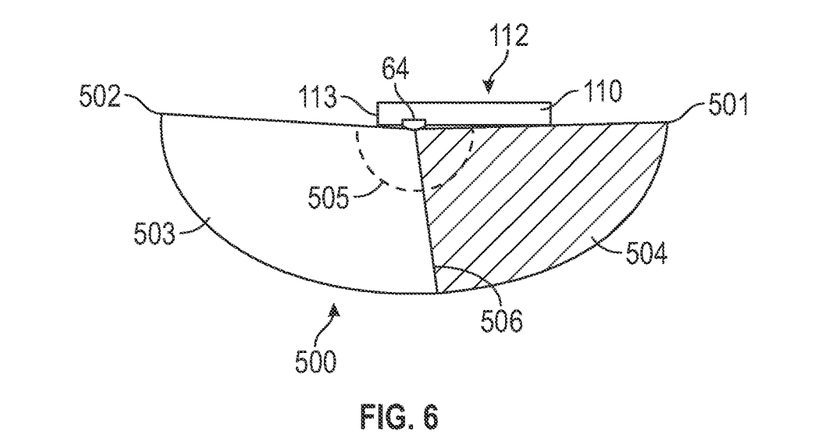
FIG. 6 is a schematic side view of a camera mounted to a gate in an opened configuration in accordance with an embodiment.

FIGS. 5 and 6 illustrate the viewing angle of the exemplary rear camera 64.

In FIG. 5, the gate 110 is in the closed configuration 111 with a distal edge 113 upright. Rear camera 64 has a viewing angle 505 of about 190 degrees. As shown, rear camera has a viewing range 500 extending from a lower terminus 501 at zero degrees to an upper terminus 502 at 190 degrees. In FIG. 5, the viewing range 500 includes a desired portion 503 of the viewing range 500 that extends from the lower terminus 501 to a crop line 506. Further, the viewing range 500 includes a non-desired portion 504 that extends from the crop line 506 to the upper terminus 502. In exemplary embodiments, the desired portion 503 is a lower portion that includes no more than 75% of the viewing angle 505, such as no more than 70%, no more than 65%, or no more than 55% of the viewing angle 505. In exemplary embodiments, the desired portion 503 is a lower portion that includes at least 25% of the viewing angle 505, such as at least 30%, at least 40%, at least 50%, or at least 55% of the viewing angle 505.

When the gate 110 is in the closed configuration 111, the system 70 processes dynamic pixel images collected by the camera 64 in viewing range 500 and crops collected images at crop line 506 to display the dynamic pixel images in the desired portion 503 on the display screen 20.

In FIG. 6, the gate 110 is in the opened configuration 112 with a distal edge 113 extended laterally away from the vehicle. Rear camera 64 has a viewing angle 505 of about 190 degrees. As shown, rear camera has a viewing range 500 extending from a lower terminus 501 at zero degrees to an upper terminus 502 at 190 degrees. In FIG. 5, the viewing range 500 includes a desired portion 503 of the viewing range 500 that extends from the upper terminus 502 to a crop line 506. Further, the viewing range 500 includes a non-desired portion 504 that extends from the crop line 506 to the lower terminus 501. In exemplary embodiments, the desired portion 503 is an upper portion that includes no more than 75% of the viewing angle 505, such as no more than 70%, no more than 65%, or no more than 55% of the viewing angle 505. In exemplary embodiments, the desired portion 503 is an upper portion that includes at least 25% of the viewing angle 505, such as at least 30%, at least 40%, at least 50%, or at least 55% of the viewing angle 505.

When the gate 110 is in the opened configuration 112, the system 70 processes dynamic pixel images collected by the camera 64 in viewing range 500 and crops collected images at crop line 506 to display the dynamic pixel images in the desired portion 503 on the display screen 20.

Figure 7:
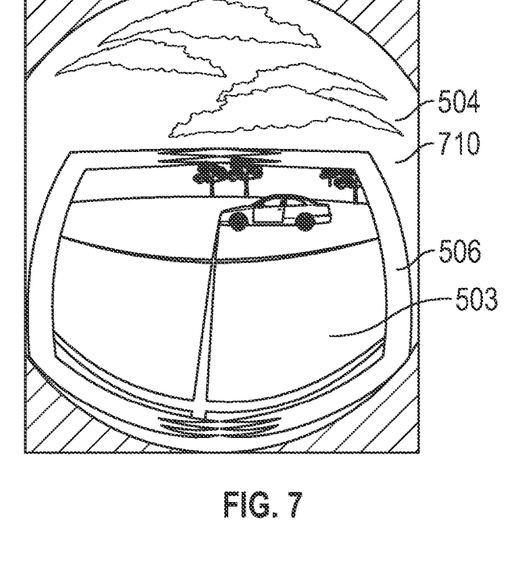
FIG. 7 is an uncropped image from a camera mounted to a gate in a closed configuration in accordance with an embodiment.

FIG. 7 illustrates collected dynamic pixel images 710 taken from a rear camera in a closed configuration. The desired portion 503 of the images 710 is outlined by crop line 506, with the remaining non-desired portion 504 located above the crop line 506.

Figure 8:
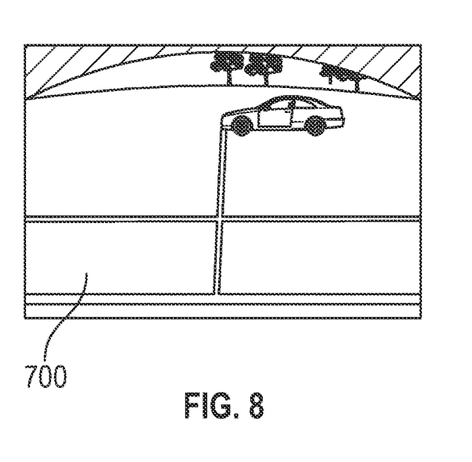
FIG. 8 is a cropped display of the image of FIG. 7 in accordance with an embodiment.

FIG. 8 illustrates a display 700 of the desired portion 503 of the images 710.

Figure 9:
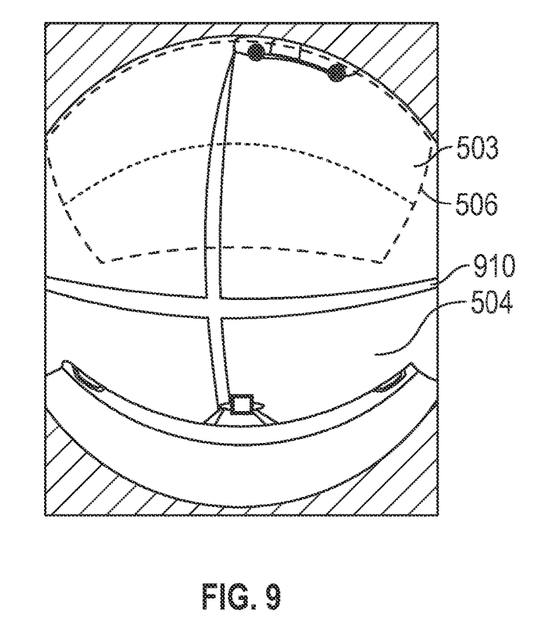
FIG. 9 is an uncropped image from a camera mounted to a gate in an opened configuration in accordance with an embodiment.

FIG. 9 illustrates collected dynamic pixel images 910 taken from a rear camera in an opened configuration. The desired portion 503 of the images 710 is outlined by crop line 506, with the remaining non-desired portion 504 located below the crop line 506.

Figure 10:
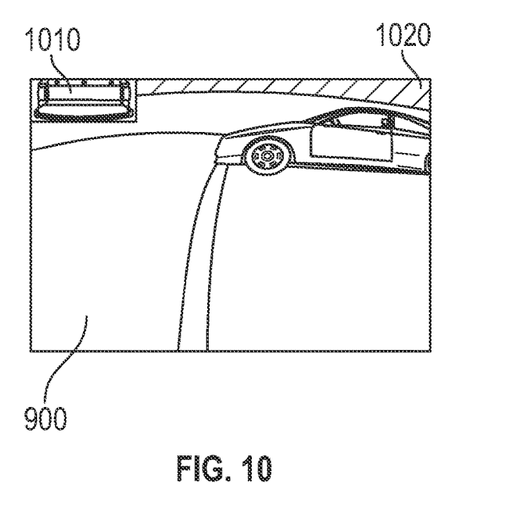
FIG. 10 is a cropped display of the image of FIG. 9 in accordance with an embodiment.

FIG. 10 illustrates a display 900 of the desired portion 503 of the images 910. Further, FIG. 10 illustrates an embodiment in which a graphical overlay 1010 is provided in the cropped horizon region 1020 of the displayed image. Specifically, the graphical overlay 1010 is a representation of the vehicle 100 with the gate 110 in the opened configuration. Such a graphical overlay 1010 may be saved in the memory and may be automatically rendered when the gate is in the opened configuration and the vehicle is in reverse. The graphical overlay 1010 may emphasize to the driver that the gate is open. Although only shown in FIG. 10, it is contemplated that such a graphical overlay 1010 may be provided in any of the displayed images described herein.

Figure 11:
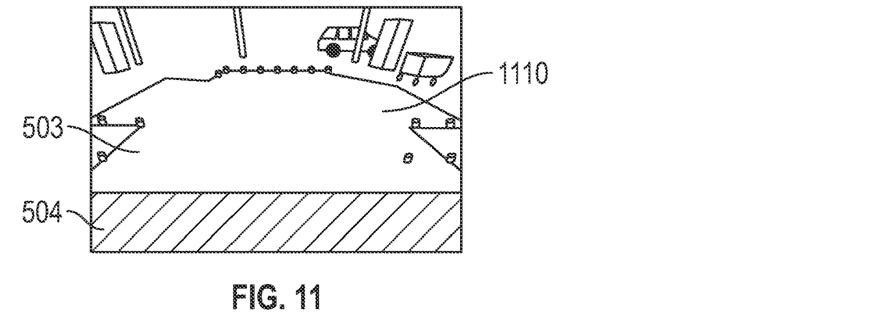
FIG. 11 is an uncropped image from a camera mounted to a gate in an opened configuration in accordance with an embodiment.
Figure 12:
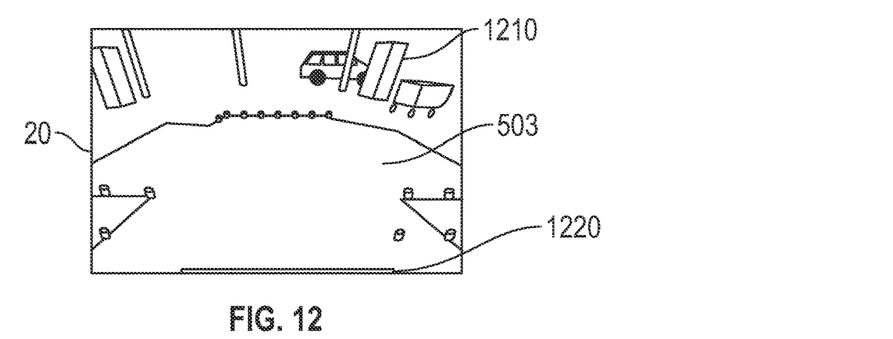
FIG. 12 is a cropped display of the image of FIG. 11 in accordance with an embodiment.

FIGS. 11-12 illustrate a graphical overlay over the displayed image on a display screen 20. FIG. 11 illustrates collected dynamic pixel images 1110 taken from a rear camera in an opened configuration. The desired portion 503 of the images 1110 is located above the non-desired portion 504 of the images 1110.

FIG. 12 shows a display screen 20 providing a rearview image 1210 of the cropped dynamic pixel images, i.e., the desired portion 503. Further, the displayed image 1210 further includes a graphical overlay 1220. In exemplary embodiments, the graphical overlay 1220 depicts an outline of the terminal distal edge 113 of the gate 110 in the opened configuration. Such an outline may be saved in the memory 90.

Figure 13:
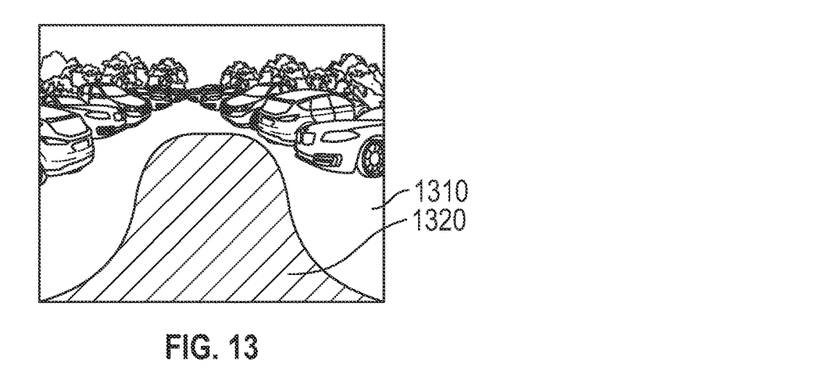
FIG. 13 is a cropped display of an image from a camera mounted to a gate in an opened configuration in accordance with an embodiment.
Figure 14:
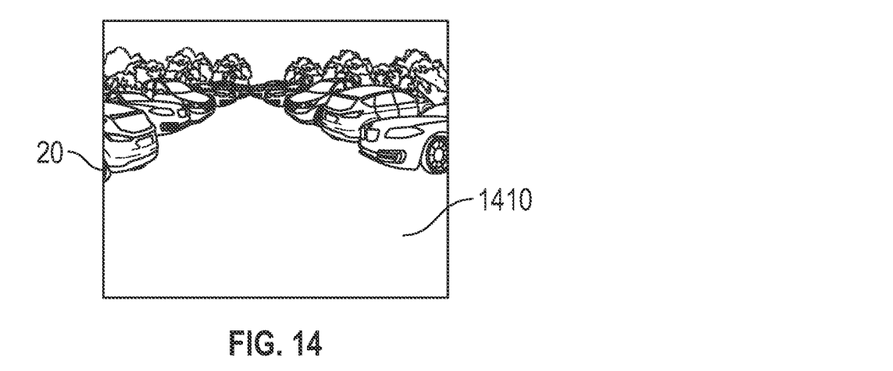
FIG. 14 is a display of the image of FIG. 13 with the shadow removed in accordance with an embodiment.

FIGS. 13-14 illustrate processing of an image with a shadow from the gate. FIG. 13 illustrates collected dynamic pixel images 1310 taken from a rear camera in an opened configuration. As shown, a shadow 1320 from the opened gate is present in the collected dynamic pixel images 1310. The system 70 is provided with the capability of identifying the presence of shadow 1320 in the collected dynamic pixel images 1310. In response, the system 70 may remove the shadow 1320 via data processing. Alternatively, the processor 80 may activate the light 50 and illuminate the area behind the vehicle, thus reducing or eliminating the shadow.

FIG. 14 shows the display screen 20 view of the collected pixel images 1410 with the shadow removed.

Figure 15:
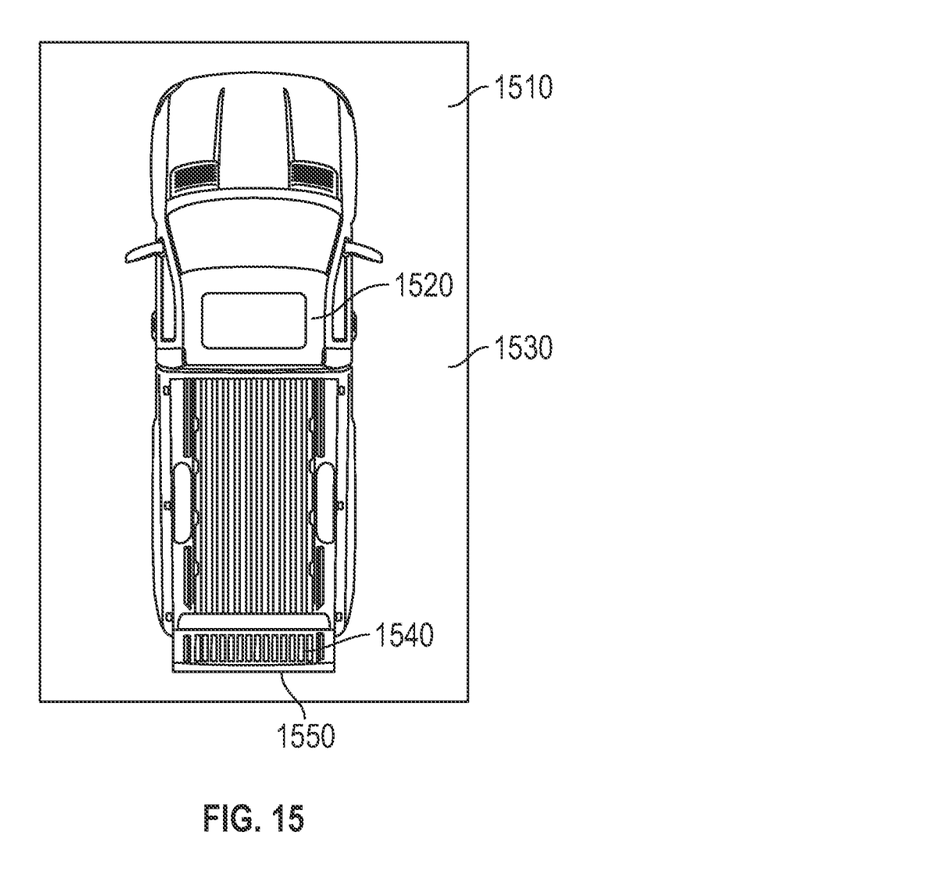
FIG. 15 is an exemplary bird-eye view rendered on a display, in accordance with various embodiments.

FIG. 15 is an exemplary image 1510 of a bird-eye view rendered on a display screen 20, in accordance with various embodiments. Such image 1510 may be provided on a display screen 20 adjacent to an image from FIG. 8 or 10-14, or may be provided by itself. As shown, the image 1510 includes a graphical overlay 1520 of the vehicle 100 that may be superimposed over a portion of the surround view 1530 obtained from dynamic pixel images collected by all cameras 60. When the gate 110 in the opened configuration, the system may automatically modify or add to the graphical overlay 1520 of the vehicle 100 to illustrate an opened gate 110. Specifically, a graphical overlay 1540 of the gate is added to the graphical overlay 1520 of the vehicle 100 or a graphical overlay of a vehicle with an opened gate is substituted for the graphical overlay 1520. In exemplary embodiments, a terminal edge graphical overlay 1550 may be emphasized or highlighted in a high visibility color to provide a reminder to the driver about the gate status. In exemplary embodiments, the graphical overlays 1520, 1540, and 1550 may be saved in the memory 90.

Figure 16:
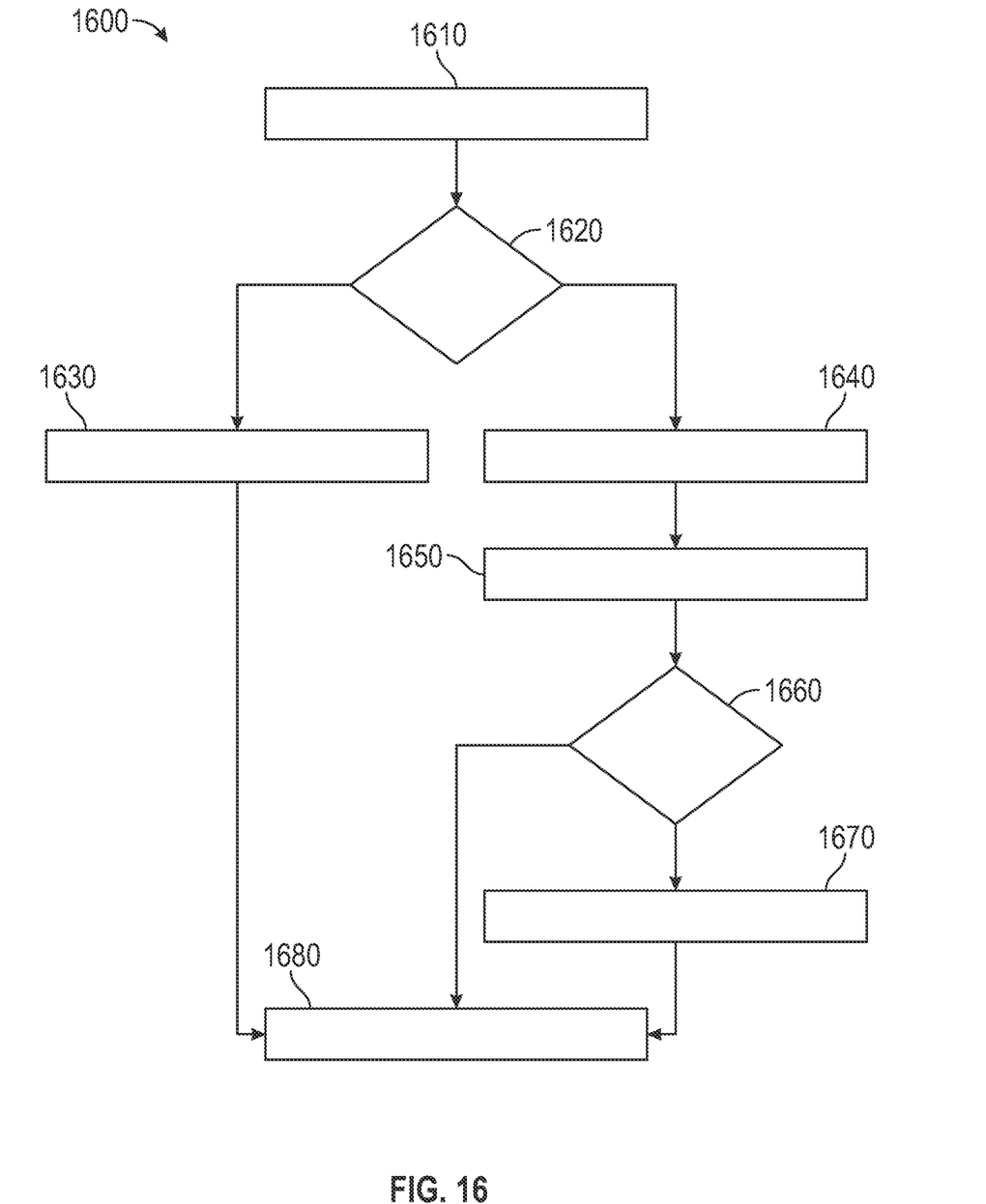
FIG. 16 is a flowchart of a method for display a rearview for a vehicle having a gate moveable between a closed configuration and an opened configuration in accordance with an embodiment.

Referring to FIG. 16, a method 1600 for augmenting a rearview display for a vehicle having a gate moveable between a closed configuration and an opened configuration is illustrated. The method 1600 includes, at action 1610, collecting dynamic pixel images of an area behind the vehicle using a rear camera mounted on the gate.

As shown, the exemplary method 1600 includes, at inquiry 1620, determining the status of gate on which the camera is mounted, i.e., whether the gate is closed or opened. In exemplary embodiments, the processor determines the status of the gate. For example, the processor may include instructions for identifying the license plate or another key feature which is present in images collected from one configuration, but not present in image collected from the other configuration. For example, the pixel images collected from the camera when the gate is opened include the license plate, while the pixel images collected when the gate is closed do not include the license plate.

When inquiry 1620 determines that the gate is closed, method 800 continues at action 1630 with cropping the image based on the gate status. For example, when the gate is closed the processor crops out the non-desired upper portion. The method 800 then displays the cropped image on the display screen at action 1680.

When inquiry 1620 determines that the gate is opened, method 800 continues at action 1640 with cropping the image based on the gate status. For example, when the gate is opened the processor crops out the non-desired lower portion.

Method 1600 continues at action 1650 with adding a graphical overlay to the cropped image. For example, the processor may overlay an outline of the terminal edge of the opened gate over the cropped image.

Method 800 may continue at inquiry 1660 with determining whether a shadow is present in the cropped image. When inquiry 1660 determines that no shadow is present, the method continues with displaying the cropped image with the graphical overlay at action 1680.

When inquiry 1660 determines that a shadow is present, the method continues with action 1670 in which the shadow is removed or reduced. For example, the processor may perform image processing to reduce or eliminate the shadow based on previous images in which the shadow is not present. Alternatively or additionally, the processor may activate a light, such as a hitch light, to illuminate the area shaded by the opened gate.

Thereafter, method 1600 may continue with displaying the cropped image with the graphical overlay and reduced shadowing at action 1680.

As described herein, a vehicle is provided with a plurality of cameras. Specifically, the exemplary vehicle includes a camera mounted on the front end, a camera mounted on the right side, a camera mounted on the left side, and a camera mounted on the rear gate. In exemplary embodiments, each camera is identical and has a first viewing angle in a first direction and a second viewing angle in a second direction perpendicular to the first direction. In exemplary embodiments, the second viewing angle is greater than the first viewing angle. In exemplary embodiments, the cameras on the front end, the right side and the left side are all mounted with a same orientation. Namely, with the second viewing angle in the horizontal direction and the first viewing angle in the vertical direction. In exemplary embodiments, the camera on the rear gate is mounted at a 90 degree angle relative to the other cameras such that the second viewing angle extends in the vertical direction and the first camera angle extends in the horizontal direction. As a result, the camera mounted on the gate may provide sufficient viewing of the area behind the vehicle when the gate is closed and when the gate is open.

Further, exemplary embodiments herein provide for automatic determination by the rearview display system whether the gate is in the closed or opened configuration based on the images collected by the rear camera. Further, in response to the determination of the gate configuration, in exemplary embodiments, the rearview display system crops the appropriate portion of the images collected by the camera for display on a display screen.

Also, it has been found that with the orientation of the rear camera and the image cropping provided, blind spots at the terminal corners of the gate in the opened configuration are eliminated or reduced.

Further, embodiments herein provide for displaying a graphical overlay of a terminal edge of the gate over the cropped image when the gate is in the opened configuration.

Also, embodiments herein provide for identifying when a shadow from a gate in the opened configuration is present in the collected images and provides for eliminating the shadow from the image via data processing or by activating a light to reduce the shadow.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A vehicle comprising:
a front end and a rear end;
a left side and a right side;
a plurality of cameras including a first camera, a second camera, a third camera, and a fourth camera, wherein:
each camera has a first viewing angle in a first direction and has a second viewing angle, greater than the first viewing angle, in a second direction perpendicular to the first direction;
the first camera is mounted to the front end, a second camera is mounted to the left side, the third camera is mounted to the right side, and each of the first camera, the second camera, and the third camera are oriented with the first viewing angle extending in a vertical direction and the second viewing angle extending in a horizontal direction; and
the fourth camera is mounted to the rear end and is oriented with the first viewing angle extending in the horizontal direction and the second viewing angle extending in the vertical direction;
a gate at the rear end, wherein the gate is moveable between a closed configuration and an opened configuration, wherein the fourth camera is mounted to the gate and is configured to collect dynamic pixel images of an area behind the vehicle;
a hitch light at the rear end;
a display screen configured to display the collected dynamic pixel images; and
memory configured to comprise one or more executable instructions and a processor configured to execute the executable instructions, wherein the executable instructions enable the processor to identify when a gate shadow from the gate is present in the collected dynamic pixel images and to activate the hitch light to reduce the gate shadow.

2. The vehicle of claim 1, wherein the executable instructions enable the processor to crop the collected dynamic pixel images to display a lower portion of the collected dynamic pixel images on the display screen when the gate is in the closed configuration, and to crop the collected dynamic pixel images to display an upper portion of the collected dynamic pixel images on the display screen when the gate is in the opened configuration.

3. The vehicle of claim 2, wherein the lower portion of the collected dynamic pixel images comprises no more than 75% of the second viewing angle and wherein the upper portion of the collected dynamic pixel images comprises no more than 75% of the second viewing angle.

4. The vehicle of claim 1, wherein the executable instructions enable the processor to display a graphical overlay to the collected dynamic pixel images on the display screen when the gate is in the opened configuration, and wherein the graphical overlay depicts an outline of a terminal edge of the gate in the opened configuration.

5. The vehicle of claim 1, wherein the executable instructions enable the processor to identify when the gate is in the opened configuration.

6. The vehicle of claim 1, wherein the executable instructions enable the processor to remove the gate shadow from the collected dynamic pixel images.

7. The vehicle of claim 1, wherein the first viewing angle is between 140 to 160 degrees and the second viewing angle is greater than 180 degrees.

8. A rearview display system for a vehicle having a gate moveable between a closed configuration and an opened configuration, the system comprising:
a camera mounted to the gate and configured to collect dynamic pixel images of an area behind the vehicle;
a hitch light mounted to a rear end of the vehicle;
a display screen configured to display the collected dynamic pixel images;
memory configured to comprise one or more executable instructions and a processor configured to execute executable instructions, wherein the executable instructions enable the processor to identify when a gate shadow from the gate is present in the collected dynamic pixel images and to activate the hitch light to reduce the gate shadow, to crop the collected dynamic pixel images to display a lower portion of the collected dynamic pixel images on the display screen when the gate is in the closed configuration, and to crop the collected dynamic pixel images to display an upper portion of the collected dynamic pixel images on the display screen when the gate is in the opened configuration.

9. The rearview display system of claim 8, wherein the camera is oriented with a first viewing angle extending in a horizontal direction and a second viewing angle extending in a vertical horizontal direction, wherein the second viewing angle is greater than the first viewing angle.

10. The rearview display system of claim 9, wherein the lower portion of the collected dynamic pixel images comprises no more than 75% of the second viewing angle and wherein the upper portion of the collected dynamic pixel images comprises no more than 75% of the second viewing angle.

11. The rearview display system of claim 8, wherein:
when the gate is in the opened configuration, an upper edge of the lower portion of the collected dynamic pixel images is located within 5 degrees of a horizon; and
when the gate is in the closed configuration, a lower edge of the upper portion of the collected dynamic pixel images is located within 5 degrees of the horizon.

12. The rearview display system of claim 8, wherein the executable instructions enable the processor to display a graphical overlay to the collected dynamic pixel images on the display screen when the gate is in the opened configuration, and wherein the graphical overlay depicts an outline of a terminal edge of the gate in the opened configuration.

13. The rearview display system of claim 8, wherein the executable instructions enable the processor to identify when the gate is in the opened configuration.

14. The rearview display system of claim 8, wherein the executable instructions enable the processor to remove the gate shadow from the collected dynamic pixel images.

15. A method for augmenting a rearview display for a vehicle having a gate moveable between a closed configuration and an opened configuration, the method comprising:
collecting dynamic pixel images of an area behind the vehicle using a camera mounted on the gate;
when the gate is in the closed configuration, cropping the collected dynamic pixel images to display a lower portion of the collected dynamic pixel images on a display screen, via a processor;
when the gate is in the opened configuration, cropping the collected dynamic pixel images to display an upper portion of the collected dynamic pixel images on the display screen, via the processor;

identifying that a gate shadow from the gate is present in the collected dynamic pixel images, via the processor; and after identifying that the gate shadow from the gate is present in the collected dynamic pixel images, activating a hitch light to reduce the gate shadow, via the processor.

16. The method of claim 15, further comprising displaying a graphical overlay to the collected dynamic pixel images on the display screen when the gate is in the opened configuration, via the processor, and wherein the graphical overlay depicts an outline of a terminal edge of the gate in the opened configuration.

17. The method of claim 15, further comprising identifying, via the processor, when the gate is in the opened configuration from the collected dynamic pixel images.

18. The method of claim 15, further comprising removing the gate shadow from the collected dynamic pixel images, via the processor.

19. The method of claim 15, wherein the camera is oriented with a first viewing angle extending in a horizontal direction and a second viewing angle extending in a vertical horizontal direction, wherein the second viewing angle is greater than the first viewing angle.

20. The method of claim 19, wherein the lower portion of the collected dynamic pixel images comprises no more than 75% of the second viewing angle and wherein the upper portion of the collected dynamic pixel images comprises no more than 75% of the second viewing angle.

* * * * *